United States Patent [19]

Suomi

[11] Patent Number: 5,020,919

[45] Date of Patent: Jun. 4, 1991

[54] HEAT FLOW SENSING APPARATUS AND METHOD

[75] Inventor: Verner K. Suomi, Madison, Wis.

[73] Assignee: Wisconsin Alumni Research Foundation, Madison, Wis.

[21] Appl. No.: 513,251

[22] Filed: Apr. 24, 1990

[51] Int. Cl.⁵ .................. G01K 1/00; G01K 1/14; G01K 17/00
[52] U.S. Cl. ..................... 374/29; 374/156; 374/208
[58] Field of Search .............. 374/29, 30, 136, 156, 374/157, 189, 166, 10, 208, 179; 73/322.5, 292, 295, 313; 364/557

[56] References Cited

U.S. PATENT DOCUMENTS

| | | | |
|---|---|---|---|
| 2,017,221 | 10/1935 | Hastings | 374/156 |
| 3,670,572 | 6/1972 | Devereux et al. | 374/136 X |
| 4,410,282 | 10/1983 | Legar et al. | 374/156 |
| 4,738,549 | 4/1988 | Plimpton | 374/156 X |

*Primary Examiner*—William A. Cuchlinski, Jr.
*Assistant Examiner*—Joseph A. Rhoa
*Attorney, Agent, or Firm*—Olson & Hierl

[57] ABSTRACT

An apparatus for determining heat flow at an interface between a water surface and the atmosphere comprising a floatable transparent panel member having a lower surface in contact with the water and an upper surface covered with a thin layer of water. A plurality of thermocouples are carried on both surfaces of the panel member for sensing the temperature of the water and the water layer in contact with the atmosphere. Electronic circuit means operatively associated with the thermocouple means records the temperature readings whereby the difference between the temperatures provides a measure of the heat flow at the interface.

31 Claims, 1 Drawing Sheet

HEAT FLOW SENSING APPARATUS AND METHOD

TECHNICAL FIELD

The present invention generally relates to heat flow sensors, and in particular, to an apparatus and method for determining heat flow at an interface between the surface of a liquid such as water and the overlying atmosphere.

BACKGROUND OF THE INVENTION

The largest fraction of the heat energy received by the atmosphere is derived from the condensation of water vapor, primarily from oceanic evaporation. The area of the ocean surface is almost three times that of land so heat flow changes at the air-water interface of the ocean have profound meteorological and climatological consequences. An understanding of the processes which occur at the air-water interface is fundamental to an understanding of atmospheric behavior.

The temperature at the interface between the ocean and the air is typically about 0.5 degrees Centigrade lower than the temperature immediately below the surface. This reduced temperature is caused by evaporative cooling at the surface of the ocean and is referred to as the sea-surface temperature (SST). The SST depends partly on physical processes occurring within the ocean itself, such as convective stirring and turbulent mixing, and partly on the influence of the overlying atmosphere. The SST exhibits complex patterns, with warm and cold areas in close juxtaposition, especially in regions where diverging and converging currents are found. These regions of strong horizontal temperature gradients are called oceanic fronts.

The SST is normally measured from surface vessels, but that method provides various sources of error. Thus, increasing use is now being made of infra-red temperature sensors carried in aircraft or satellites to obtain SST readings over relatively large areas.

Persons concerned with naval matters and, for example, fisheries and meteorologists require up-to-date forecasts of SST conditions. Charts of mean SST values are available to show expected variations of SST with latitude, but the actual temperature values are often modified considerably by ocean conditions. Thus, a system is required for accurately and efficiently determining the temperature of the air-water interface in the oceans and other large bodies of water as a means for predicting climate and weather conditions.

However, the transfer of heat between the oceans and the atmosphere is one of the most poorly understood phenomenon in climatology. Understanding the ocean-atmosphere interaction in accordance with the laws of thermodynamics is vital. It is important to understand and quantify this heat transfer in order to accurately predict weather changes.

There are a number of generally recognized methods of measuring the heat flow between the ocean and the atmosphere. The first is the bulk aerodynamics method in which measurements of wind, temperature and moisture are made a few meters above the ocean surface. Non-dimensional heat transfer coefficients are used to arrive at the heat flow from the data derived by this method. However, atmospheric instability and changes in wind velocity contribute to an expected mean error of about thirty percent for this method.

Another method involves mean dissipation which utilizes the spectral densities of wind, temperature and moisture to obtain kinetic energy, temperature and moisture variations and thus to derive the heat flow. The mean dissipation method can yield results that differ from those obtained by the bulk aerodynamics method by about thirty percent or more. The degree of error is largely dependent on whether the wind speed is increasing or decreasing.

Perhaps the most accurate method presently in use is the eddy correlation method which uses sonic anemometers to integrate vertical wind speed, temperature and moisture fluctuations. One major drawback of this method is that the recording instruments must be maintained in a vertical orientation. Any deviation from vertical results in a significant error in the measured vertical wind speed. This requirement of a vertical orientation imposes significant problems in obtaining accurate measurements in the open sea due to wave action.

Moreover, each of the foregoing methods has an additional disadvantage in that the relevant measurements are taken above the ocean surface, not at the surface itself. Thus, there is a need for a system of accurately sensing temperatures at the air-water interface of the ocean to determine heat flow between the water and the atmosphere.

SUMMARY OF THE INVENTION

The present invention relates to an apparatus and method for determining heat flow at an air-water interface. The invention is particularly useful for monitoring temperature changes and determining heat flow on the surfaces of large bodies of water including oceans and lakes.

Although the preferred embodiments described herein are designed for use in an air-water environment, the apparatus will function at any liquid-gas interface.

The apparatus includes a floatable transparent panel member having a lower surface and an upper surface. The panel member can be made from a plastic material, such as Mylar, or glass. The lower surface of the panel member is in substantial contact with the water and the upper surface is adapted to receive a relatively thin layer of water. The water layer on the upper surface of the transparent panel member is in direct contact with the air.

Thermocouple means comprising a plurality of equally-spaced temperature sensors is carried by both the lower and the upper surfaces of the panel member. Other means of sensing temperature may alternatively be employed. The same amount and type of temperature sensors are associated with both surfaces of the panel member.

Electronic circuit means associated with the thermocouple means processes a signal from the thermocouple means to determine the temperature of the water below the panel member and the water layer above the panel member. Moreover, the electronic circuit means can relay a signal to a receiving station. This signal can comprise temperature data for the determination of heat loss at the air-water interface.

The invention also relates to a method of determining heat flow at an interface between a water surface and the atmosphere comprising the steps of providing a floatable panel member having a lower surface in contact with the water and an upper surface wherein the lower and upper surfaces include thermocouple means; providing a water layer on the upper surface of the panel member; sensing the temperature of the water in contact with the lower surface of the panel member; sensing the temperature of the water layer on the upper surface of the panel member; and determining the heat flow at the interface between the water and the atmosphere based on the difference between the temperature of the water and the temperature of the water layer above the thermocouple means.

In accordance with the foregoing method, the heat flow is determined according to the equation:

$$Q = k(dT/dZ)$$

wherein k is the thermal conductivity of the panel member, dT is the difference between the temperature of the water in contact with the lower surface of the panel member and the temperature of the water layer on the upper surface of the panel member, dZ is the thickness of the panel member and Q is the heat flow per unit area.

In an alternative embodiment, the apparatus can include cover means mounted by support means over the transparent panel member. The cover means comprises a plastic sheet which can optionally include a reflective layer on its inner surface. In this embodiment, the cover means and the panel member define a substantially enclosed portion.

When the foregoing embodiment includes cover means with the reflective layer, the heat flow equals the evaporation plus sensible heat loss. Using appropriate well-known conversion factors as described herein, each term can be determined individually.

Moreover, when the inner surface of the cover means includes a reflective layer, the heat flow equals the long wave radiative loss only. If the upper surface of the panel is kept dry, then the difference between the long wave radiative loss and the total heat loss yields the evaporation. An accurate determination of these values is of interest in weather forecasting.

Accordingly, one advantage of the present apparatus is that accurate and reproducible measurements of the heat flow between a water surface and the atmosphere are provided. Moreover, the heat flow measurements are determined directly at the interface between the water and the air. The invention is particularly useful for monitoring temperature changes in the surfaces of large bodies of water including oceans and lakes.

BRIEF DESCRIPTION OF THE DRAWINGS

In the accompanying drawings, which form a portion of this disclosure.

DESCRIPTION OF THE PREFERRED EMBODIMENTS

The apparatus of this invention can be assembled and used in many different forms. This detailed description and the accompanying drawings disclose only specific forms which provide examples of several preferred embodiments. The particular shapes and sizes of the components described herein are not essential to the invention unless otherwise indicated. Moreover, the invention is not intended to be limited to the embodiments illustrated.

Figure 1:
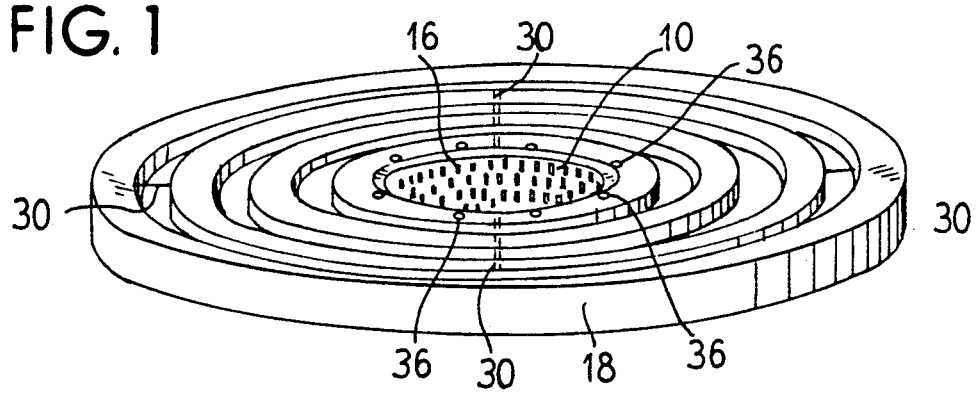
FIG. 1 is a perspective view of one embodiment of the present apparatus.
Figure 3:
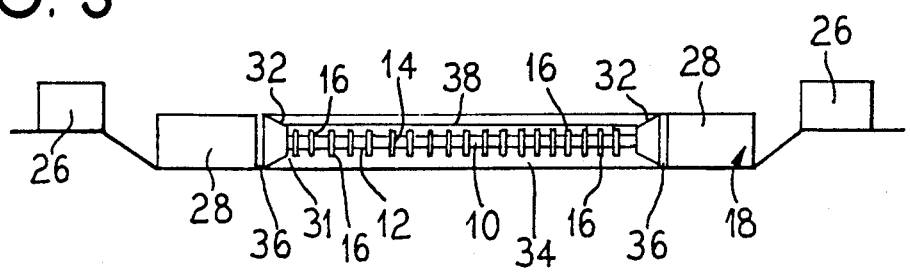
FIG. 3 is a detailed view of a portion of FIG. 2.

The apparatus of the present invention is shown in perspective in FIG. 1. The apparatus includes a panel member 10 having a lower surface 12 and an upper surface 14. These features are more clearly shown in FIG. 3. The panel member is preferably transparent and can comprise a thin sheet of relatively rigid plastic, such as Mylar, or glass. Both of the surfaces 12 and 14 of the panel member include an array of temperature sensors 16 which comprise thermocouple means.

The panel member 10 is supported on the surface of the water by flotation means 18 which in the illustrated embodiments comprises a plurality of concentric flotation members 20, 22, 24, 26 and 28. In particular, these can include an outer flotation member 20, a plurality of intermediate flotation members 22, 24 and 26 and a central flotation member 28. The sizes, shapes, materials and number of flotation members depends on the intended use and the conditions encountered during use of the apparatus. For example, the flotation members can comprise styrofoam or cork. Moreover, the flotation means can comprise an integral unit, if desired.

Preferably, the flotation members 20-28 are joined by connecting means 30 which can comprise a water-resistant cable or rope. The connecting means 30 is not drawn taut, but provides some slack to permit the flotation members some flexibility of movement while supported on the surface of the ocean.

The flotation members serve three principal purposes. First, the flotation members provide the necessary buoyancy to maintain the device on the surface of the water. Moreover, the flotation members provide a wave barrier to protect the thermocouple means carried by panel member 10. Towards this end, the outer flotation member 20 can have a generally trapezoidal shape in cross-section with the larger base portion being oriented outwardly to somewhat reduce the impact of the waves on the apparatus. In addition, the flotation members provide a support for the other components of the apparatus.

Figure 2:
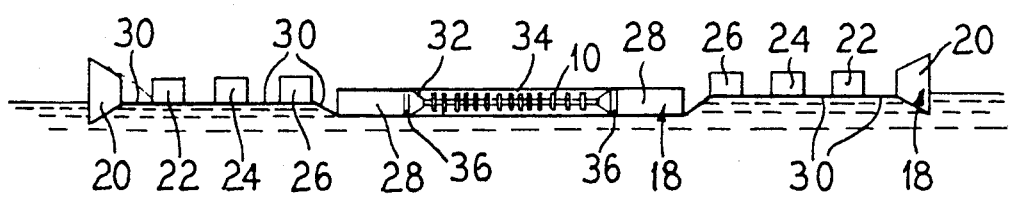
FIG. 2 is a sectional view taken along the plane 2—2 of FIG. 1.

Referring to FIG. 2, the central flotation member 28 includes an inner sidewall 32 which defines an opening 34 within which the panel number 10 is supported. The lower surface 12 of the panel member is in substantial contact with the water. A series of holes 36 defined along the central flotation member maintains a thin layer of water 38 on the upper surface 14 of the panel member.

The invention also relates to a method of determining heat flow at an interface between a water surface and the atmosphere comprising the steps of providing a floatable panel member having a lower surface in contact with the water and an upper surface wherein the lower and upper surfaces include thermocouple means; providing a water layer on the upper surface of the panel member; sensing the temperature of the water in contact with the lower surface of the panel member; sensing the temperature of the water layer on the upper surface of the panel member; and determining the heat flow at the interface between the water and the atmosphere based on the difference between the temperature of the water and the temperature of the water layer.

The apparatus functions as a heat flow sensor in accordance with the following equation:

$$Q = k(dT/dZ)$$

wherein k is the thermal conductivity of the panel member, dT is the difference between the temperature of the water in contact with the lower surface of the panel member and the temperature of the water layer on the upper surface of the panel member, dZ is the thickness of the panel member and Q is the heat flow per unit area (preferably expressed in watts per unit area).

On the open ocean, without whitecaps or spray, the heat flow is defined by the equation:

$$Q = \text{long wave radiation} = \text{evaporation} = \text{sensible heat loss} = 0$$

wherein heat flow upwardly towards the surface of the water is positive. Interposing the panel member 10 in between the water and the air reduces the heat flow slightly. Thus, the thin layer of water 38 on the upper surface 14 will be slightly cooler than the open water surface.

Figure 4:
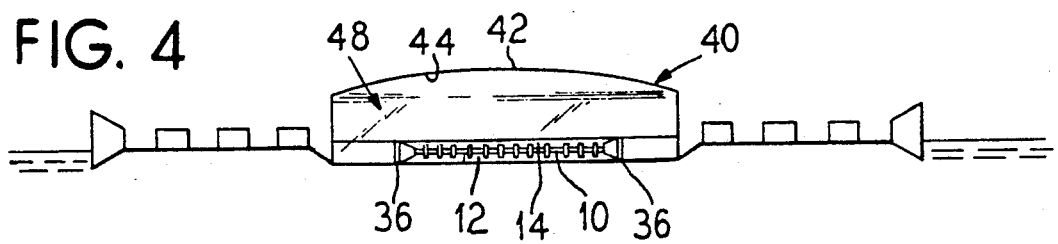
FIG. 4 is a sectional view of a second embodiment of the present invention.
Figure 5:
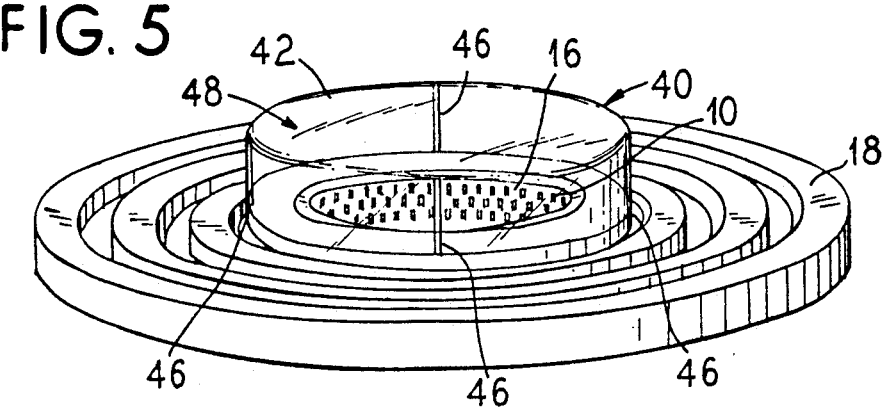
FIG. 5 is a perspective view of the embodiment shown in FIG. 4.

In an alternative embodiment, the apparatus can be configured to evaluate the foregoing three heat loss terms separately. These parameters are of particular interest to meteorologists. Referring to FIGS. 4 and 5, cover means 40, comprising a film member 42 having an inner surface 44 can be mounted over the panel member 10 by support means 46 to define a substantially enclosed portion 48. The cover means 40 functions as a radiation shield and also protects the thermocouple means from the elements. The film member 42 can be formed of plastic or glass, and the support means 46 can comprise a wire harness for maintaining the cover means 40 several inches over the panel member 10.

The inner surface 44 can include a reflective layer (not shown) which, for example, can comprise an aluminum (or glass) sheet.

If the film member 42 comprises plastic or clear glass with a high emissivity to long wave radiation and the inner surface 44 includes a reflective layer that reflects most of the solar energy and the radiant energy from the water, then:

$$Q = \text{evaporation} = \text{sensible heat loss}$$

wherein Q is the heat flow per unit area, evaporation represents the evaporation rate and the sensible heat loss is the change in enthalpy which manifests itself as a measurable change in temperature.

The Bowen ratio is a well-known factor in heat flow calculations. Assuming the Bowen ratio is accurate for the measured surface temperature, then each term can be determined individually as follows:

$$\text{Bowen ratio} = \text{sensible heat loss/evaporation}$$

In an additional alterative embodiment, the film member 42 can comprise a clear polyethylene sheet positioned over the thermocouple means on the upper surface 14 of the panel member 10 whereby the heat loss will be entirely through radiation. In that event, heat flow (Q) equals the long wave radiative loss only:

$$Q = \text{radiation}.$$

If the upper surface can be kept dry, then the difference between the long wave radiative loss and the total heat loss yields the evaporation alone.

As will be appreciated by those skilled in the art, the thermocouple means associated with electronic circuit means will generate a millivolt signal which must be amplified and converted to a voltage variable frequency for transmission. D.C. amplifier chips and voltage to frequency converters (not shown) are readily available at low cost to perform such amplification and conversions. The signal can then be relayed by telemetry to a receiving station for analysis.

A power supply (not shown), which is preferably compact, is also part of the system. The power supply can comprise batteries, fuel cells, solar energy or wave power energy as desired. Such components are well-known to those skilled in the art and are not described in detail.

The apparatus is preferably used as a free-floating heat flow sensing device which can be set adrift in a body of water and can transmit the desired data to a receiving station, for example, via the ARGUS telemetry system. However, the apparatus could just as easily be anchored or moored in specific locations depending on the water depth. Moreover, the apparatus will function at any liquid-gas interface, although the preferred embodiment is designed for use in an air-water environment.

The foregoing description is only illustrative of the principles of this invention Since numerous modifications and changes will readily occur to those skilled in the art, it is not desired to limit the invention to the particular construction and mode of operation described herein. Accordingly, all suitable modifications and equivalents are intended to fall within the scope of this invention.

What is claimed is:

1. An apparatus for determining neat flow at an interface between a water surface and the atmosphere, comprising:
   a) a floatable transparent panel member having a lower surface in contact with the water and an upper surface adapted to receive a water layer in contact with the atmosphere;
   b) thermocouple means operatively associated with the lower surface and upper surface of the transparent panel member for sensing the temperature of the water and the water layer in contact with the atmosphere; and
   c) electronic circuit means including a power supply operatively associated with the thermocouple means for recording the temperature of the water in contact with the lower surface and the water layer on the upper surface whereby the difference between the temperature of the water and the temperature of the water layer provides a measure of the heat flow at the interface.

2. The apparatus according to claim 1 in which the heat flow is determined according to the equation:

$$Q = k(dT/dZ)$$

wherein k is the thermal conductivity of the panel member, dT is the difference between the temperature of the water in contact with the lower surface of the panel member and the temperature of the water layer on the upper surface of the panel member, dZ is the thickness of the panel member and Q is the heat flow per unit area.

3. The apparatus according to claim 1 wherein the floatable transparent panel member comprises plastic or glass.

4. The apparatus according to claim 1 wherein the thermocouple means comprises a plurality of temperature sensors associated with the lower surface and the upper surface of the panel member.

5. The apparatus according to claim 1 wherein the electronic circuit means relays a signal to a receiving station.

6. The apparatus according to claim 1 further including flotation means comprising at least one concentric ring of buoyant material.

7. The apparatus according to claim 6 wherein the buoyant material is styrofoam.

8. The apparatus according to claim 1 wherein the power supply is a battery.

9. The apparatus according to claim 1 wherein the power supply includes a solar cell.

10. The apparatus according to claim 1 further comprising cover means mounted over the panel member, the cover means and the panel member defining a substantially enclosed portion.

11. The apparatus according to claim 10 including support means for mounting the cover means over the panel member.

12. The apparatus according to claim 10 wherein the substantially enclosed portion is in gaseous communication with the atmosphere.

13. The apparatus according to claim 10 wherein the cover means includes an inner surface having a reflective layer.

14. A method of determining heat flow at an interface between a water surface and the atmosphere comprising the steps of:
   a) providing a floatable panel member having a lower surface in contact with the water and an upper surface wherein the lower and upper surfaces include thermocouple means;
   b) providing a water layer on the upper surface of the panel member;
   c) sensing the temperature of the water in contact with the lower surface of the panel member;
   d) sensing the temperature of the water layer on the upper surface of the panel member; and
   e) determining the heat flow at the interface between the water and the atmosphere based on the difference between the temperature of the water and the temperature of the water layer.

15. The method according to claim 14 in which the heat flow is determined according to the equation:

$$Q = k(dT/dZ)$$

wherein k is the thermal conductivity of the panel member, dT is the difference between the temperature of the water in contact with the lower surface of the panel member and the temperature of the water layer on the upper surface of the panel member, dZ is the thickness of the panel member and Q is the heat flow per unit area.

16. The method according to claim 14 wherein the heat flow is expressed in watts per unit area.

17. The method according to claim 14 further including the step of providing cover means over the water layer.

18. The method according to claim 17 wherein the cover means includes an inner surface having a reflective layer.

19. A floatable apparatus for determining heat flow at an interface between a water surface and the atmosphere comprising:
   (a) panel means having a lower surface in contact with the water and an upper surface adapted to receive a water layer in contact with the atmosphere;
   (b) thermocouple means operatively associated with the lower surface and upper surface of the panel means for sensing the temperature of the water and the water layer in contact with the atmosphere; and
   (c) electronic circuit means including a power supply operatively associated with the thermocouple means for recording the temperature of the water in contact with the lower surface and the water layer on the upper surface whereby the difference between the temperature of the water and the temperature of the water layer provides a measure of the heat flow at the interface.

20. The apparatus according to claim 19 in which the heat flow is determined according to the equation:

$$Q = k(dT/dZ)$$

wherein k is the thermal conductivity of the panel means, dT is the difference between the temperature of the water in contact with the lower surface of the panel means and the temperature of the water layer on the upper surface of the panel means, dZ is the thickness of the panel means and Z is the heat flow per unit area.

21. The apparatus according to claim 19 wherein the panel means comprises plastic or glass.

22. The apparatus according to claim 19 wherein the thermocouple means comprises a plurality of temperature sensors associated with the lower surface and the upper surface of the panel means.

23. The apparatus according to claim 19 wherein the electronic circuit means relays a signal to a receiving station.

24. The apparatus according to claim 19 further including flotation means comprising at least one concentric ring of buoyant material.

25. The apparatus according to claim 24 wherein the buoyant material is styrofoam.

26. The apparatus according to claim 19 wherein the power supply is a battery.

27. The apparatus according to claim 19 wherein the power supply includes a solar cell.

28. The apparatus according to claim 19 further comprising cover means mounted over the panel means, the cover means and the panel means defining a substantially enclosed portion.

29. The apparatus according to claim 28 including support means for mounting the cover means over the panel means.

30. The apparatus according to claim 28 wherein the substantially enclosed portion is in gaseous communication with the atmosphere.

31. The apparatus according to claim 28 wherein the cover means includes an inner surface having a reflective layer.

* * * * *

UNITED STATES PATENT AND TRADEMARK OFFICE
CERTIFICATE OF CORRECTION

PATENT NO.   :   5,020,919
DATED        :   June 4, 1991
INVENTOR(S)  :   Verner E. Suomi It is certified that error appears in the above-identified patent and that said Letters Patent is hereby corrected as shown below:

On the title page, correct the inventor's name from "Verner K. Suomi" to --Verner E. Suomi--.

On the title page, under "References Cited", change the first patent reference from "2,017,221" to --2,019,221--.

Column 5, line 12, change
"Q = long wave radiation = evaporation = sensible heat loss = 0"
to -- -Q + long wave radiation + evaporation + sensible heat loss = 0--.

Column 5, line 43, change "Q = evaporation = sensible heat loss" to --Q = evaporation + sensible heat loss--.
Column 6, line 34:
Claim 1, line 1, change "neat" to --heat--.

Signed and Sealed this

Seventeenth Day of November, 1992

Attest:

DOUGLAS B. COMER

*Attesting Officer*       *Acting Commissioner of Patents and Trademarks*